(12) United States Patent
De Sousa Webber

(10) Patent No.: US 8,886,579 B2
(45) Date of Patent: Nov. 11, 2014

(54) METHODS, APPARATUS AND PRODUCTS FOR SEMANTIC PROCESSING OF TEXT

(75) Inventor: Francisco Eduardo De Sousa Webber, Vienna (AT)

(73) Assignee: cortical.io GmbH, Vienna (AT)

( * ) Notice: Subject to any disclaimer, the term of this patent is extended or adjusted under 35 U.S.C. 154(b) by 278 days.

(21) Appl. No.: 13/441,138

(22) Filed: Apr. 6, 2012

(65) Prior Publication Data

US 2013/0246322 A1    Sep. 19, 2013

(30) Foreign Application Priority Data

Mar. 15, 2012    (EP) .................................... 12159672

(51) Int. Cl.
  *G06E 1/00* (2006.01)
  *G06E 3/00* (2006.01)
  *G06F 15/18* (2006.01)

(52) U.S. Cl.
  USPC .......................................................... 706/18

(58) Field of Classification Search
  USPC .......................................................... 706/18
  See application file for complete search history.

(56) References Cited

U.S. PATENT DOCUMENTS

| | | |
|---|---|---|
| 7,739,208 B2 | 6/2010 | George et al. |
| 7,937,342 B2 | 5/2011 | George et al. |
| 8,037,010 B2 | 10/2011 | Jaros et al. |
| 8,103,603 B2 | 1/2012 | George et al. |
| 2007/0276774 A1 | 11/2007 | Ahmad et al. |
| 2008/0059389 A1 | 3/2008 | Jaros et al. |
| 2010/0191684 A1* | 7/2010 | George et al. ................... 706/12 |
| 2011/0225108 A1 | 9/2011 | Hawkins et al. |

OTHER PUBLICATIONS

Adaptive Translation: Finding Illterlingual Mappings Using Self-Organizing Maps Timo Honkela, Sami Virpioja, and .laakko Vayrynen Sep. 3, 2008, Artificial Neural Networks, ICANN 2008, Lecture Notes in Computer Science, Springer, Berlin D Heidelberg, pp. 603-612.*
Hierarchical Temporal Memory Concepts, Theory, and Terminology Jeff Hawkins and OlJeep George. Numenta Inc Whitepaper of Numenta, Inc., Version 0.2.1, Sep. 12, 2011.*
Office Action dated Nov. 15, 2013.
Nikolaos Ampazie, et al., LSISOM—A Latent Semantic Indexing Approach to Self-Organizing Maps of Document Collections, Neural Processing Letters 00: 1-17, 2004, 2004 Kluwer Academic Publishers. Printed in the Netherlands, 17 pages.

(Continued)

*Primary Examiner* — Wilbert L Starks
*Assistant Examiner* — Ababacar Seck
(74) *Attorney, Agent, or Firm* — Hoffmann & Baron, LLP

(57) ABSTRACT

A computer-implemented method of training a neural network includes training a first neural network of a self organizing map type with a first set of first text documents each containing one or more keywords in a semantic context to map each document to a point in the self organizing map y semantic clustering; determining, for each keyword in the first set, all points in the self organizing map to which first documents containing said keyword are mapped, as a pattern and storing said pattern for said keyword in a pattern dictionary; forming at least one sequence of keywords from a second set of second text documents each containing one or more keywords in a semantic context; translating said at least one sequence of keywords into at least one sequence of patterns using the pattern dictionary; and training a second neural network with the at least one sequence of patterns.

16 Claims, 10 Drawing Sheets

(56) References Cited

OTHER PUBLICATIONS

Bishop C. M., "Neural Networks for Pattern Recognition", Oxford University Press, New York, 1995/2010.
Rey, G. D., Wender K. F., "Neurale Netze", 2nd edition, Hans Huber, Hofgrefe AG, Bern, 2011.
Kohonen, T., "The Self-Organizing Map", Proceedings of the IEEE, 78(9), 1464-1480, 1990.
Kohonen, T., Somervuo, P., "Self-Organizing Maps of Symbol Strings", Neurocomputing, 21(1-3), 19-30, 1998.
Kaski, S., Honkela, T., Lagus, K., Kohonen, T., "Websom-Self-Organizing Maps of Document Collections", Neurocomputing, 21(1-3), 101-117, 1998.
Merkl, D., "Text Classification with Self-Organizing Maps: Some Lessons Learned", Neurocomputing, 21(1-3), 61-77, 1998.
Vesanto, J., Alhoniemi, E., "Clustering of the Self-Organizing Map", IEEE Transactions on Neural Networks, 11(3), 586-600, 2000.
Pölzlbauer G., Dittenbach M., Rauber A., "Advanced Visualization of Self-Organizing Maps with Vector Fields", IEEE Transactions on Neural Networks 19, 911-922, 2006.
Hawkins, J., George, D., Niemasik, J., "Sequence Memory for Prediction, Inference and Behaviour", Philosophical Transactions of the Royal Society of London, Series B, Biological Sciences, 364(1521), 1203-9, 2009.
Starzyk, J. A., He, H., "Spatio-Temporal Memories for Machine Learning: A Long-Term Memory Organization", IEEE Transactions on Neural Networks, 20(5), 768-80, 2009.
Numenta, Inc., "Hierarchical Temporal Memory Including HTM Cortical Learning Algorithms", Whitepaper of Numenta, Inc., Version 0.2.1, Sep. 12, 2011.
Rodriguez A., Whitson J., Granger R., "Derivation and Analysis of Basic Computational Operations of Thalamocortical Circuits", Journal of Cognitive Neuroscience, 16:5, 856-877, 2004.
Rodriguez, R. J., Cannady, J. A., "Towards a Hierarchical Temporal Memory Based Self-Managed Dynamic Trust Replication Mechanism in Cognitive Mobile Ad-hoc Networks", Proceedings of the 10th WSEAS international conference on artificial intelligence, knowledge engineering and data bases, 2011.
First EP Office Action for Application No. 12 159 672.0-1951, dated Apr. 24, 2013.
Written Opinion of the International Preliminary Examining Authority for International Application No. PCT/EP2013/053546 dated Mar. 11, 2014.
Extended European Search Report issued in EP12159672 on Jul. 10, 2012.
Honkela, Timo, et al., "Adaptive Translation: Finding Interlingual Mappings Using Self-Organizing Maps", Sep. 3, 2008, Artificial Neural Networks, ICANN 2008, Lecture Notes in Computer Science, Springer, Berlin Heidelberg, pp. 603-612.
Hawkins, Jeff, et al., "Hierarchical Temporal Memory Concepts, Theory, and Terminology", Internet Citation, Mar. 27, 2007, pp. 1-20, URL:http://www.numenta.com/Numenta_HTM_Concepts.pdf.
Yang, Hsin-Chang, et al., "Mining Multilingual Texts Using Growing Hierarchical Self-Organizing Maps", Machine Learning and Cybernetics, 2007 International Conference on Machine Learning and Cybernetics, Hong Kong, Aug. 2007, pp. 2263-2268.
Ritter, H. et al., "Self-Organizing Semantic Maps", Biological Cybernetics, Springer Verlag. Heidelberg, DE, vol. 61, No. 4, Aug. 1, 1989, pp. 241-254.
Starzyk, J.A., et al., "Spatio-Temporal Memories for Machine Learning: A Long-Term Memory Organization", IEEE Transactions on Neural Networks, IEEE Service Center, Piscataway, NJ, US, vol. 20, No. 5, May 1, 2009, pp. 768-780.
Somervuo, P.J., "Online algorithm for the self-organizing map of symbol strings", Neural Networks, Elsevier Science Publishers, Barking, GB, vol. 17, No. 8-9, Oct. 1, 2004, pp. 1231-1239.

* cited by examiner

METHODS, APPARATUS AND PRODUCTS FOR SEMANTIC PROCESSING OF TEXT

CROSS-REFERENCE TO RELATED APPLICATION

This application claims priority to European Patent Application No. 12 159 672.0, filed on Mar. 15, 2012, the contents of which are hereby expressly incorporated by reference.

FIELD OF THE INVENTION

The present invention relates to a method of training a neural network, in particular for semantic processing, classification and prediction of text. The invention further relates to computer-readable media and classification, prediction and translation machines based on neural networks.

BACKGROUND

In the context of the present disclosure, the term "neural network" designates a computer-implemented, artificial neural network. An overview of the theory, types and implementation details of neural networks is given e.g. in Bishop C. M., "Neural Networks for Pattern Recognition", Oxford University Press, New York, 1995/2010; or Rey, G. D., Wender K. F., "Neurale Netze", $2^{nd}$ edition, Hans Huber, Hofgrefe A G, Bern, 2011.

The present invention particularly deals with the semantic processing of text by neural networks, i.e. analyzing the meaning of a text by focusing on the relation between its words and what they stand for in the real world and in their context. In the following, "words" (tokens) of a text comprise both words in the usual terminology of language as well as any units of a language which can be combined to form a text, such as symbols and signs. From these words, we disregard a set of all-too-ubiquitous words such as "the", "he", "at" et cet. which have little semantic relevance to leave what we call "keywords" of a text.

Applications of semantic text processing are widespread and encompass e.g. classification of text under certain keywords for relevance sorting, archiving, data mining and information retrieval purposes. Understanding the meaning of keywords in a text and predicting "meaningful" further keywords to occur in the text is for example useful for semantic query expansion in search engines. Last but not least, semantic text processing enhances the quality of machine translations by resolving ambiguities of a source text when considering its words in a larger semantic context.

Hitherto existing methods of semantic text processing, in particular for query expansion in search engines, work with large statistical indexes for keywords, their lemma (lexical roots) and statistical relations between the keywords to build large thesaurus files, statistics and dictionaries for relational analysis. Statistical methods are, however, limited in depth of semantic analysis when longer and more complex word sequences are considered.

On the other hand, neural networks are primarily used for recognizing patterns in complex and diverse data, such as object recognition in images or signal recognition in speech, music or measurement data. Neural networks have to be correctly "trained" with massive amounts of training data in order to be able to fulfill their recognition task when fed with "live" samples to be analyzed. Training a neural network is equivalent with configuring its internal connections and weights between its network nodes ("neurons"). The result of the training is a specific configuration of usually weighted connections within the neural network.

Training a neural network is a complex task on its own and involves setting a multitude of parameters with e.g. iterative or adaptive algorithms. Training algorithms for neural networks can therefore be considered as a technical means for building a neural network for a specific application.

While neural networks are currently in widespread use for pattern recognition in large amounts of numerical data, their application to text processing is at present limited by the form in which a text can be presented to a neural network in a machine-readable form.

SUMMARY OF THE INVENTION

It is an object of the invention to ameliorate the interface between text on the one hand and neural networks on the other hand in order to better exploit the analyzing power of neural networks for semantic text processing.

In a first aspect of the invention, there is provided a computer-implemented method of training a neural network, comprising:

training a first neural network of a self organizing map type with a first set of first text documents each containing one or more keywords in a semantic context to map each document to a point in the self organizing map by semantic clustering;

determining, for each keyword occurring in the first set, all points in the self organizing map to which first documents containing said keyword are mapped, as a pattern and storing said pattern for said keyword in a pattern dictionary;

forming at least one sequence of keywords from a second set of second text documents each containing one or more keywords in a semantic context;

translating said at least one sequence of keywords into at least one sequence of patterns by using said pattern dictionary; and training a second neural network with said at least one sequence of patterns.

The second neural network trained with the innovative method is configured for and ready to be used in a variety of applications, including the following applications:

i) processing of text which contains at least one keyword, comprising:

translating said at least one keyword into at least one pattern by means of the pattern dictionary, feeding said at least one pattern as an input pattern into said trained second neural network, obtaining at least one output pattern from said trained second neural network, and translating said at least output pattern into at least one keyword by means of the pattern dictionary;

ii) semantic classification of text, when a second neural network of a hierarchical type is used, wherein said at least one input pattern is fed into at least one lower layer of the hierarchy and said at least one output pattern is obtained from at least one higher layer of the hierarchy; and iii) semantic prediction of text, when a second neural network of a hierarchical type is used, wherein said at least one input pattern is fed into at least one higher layer of the hierarchy and said at least one output pattern is obtained from at least one lower layer of the hierarchy.

In a further aspect, the invention provides for a method of generating a computer-readable dictionary for translating text into a neural network-readable form, comprising:

training a neural network of a self organizing map type with text documents each containing one or more keywords in a semantic context to map each text document to a point in the self organizing map by semantic clustering;

determining, for each keyword occurring in the first set, all points in the self organizing map to which text documents containing said keyword are mapped, as a pattern of points associated with said keyword; and storing all keywords and associated patterns as a computer-readable dictionary.

The invention also provides for a computer readable dictionary of this kind which is embodied on a computer readable medium.

Further aspects of the invention are:

a classification machine, comprising a neural network of a hierarchical temporal memory type which has been trained as said second neural network with a method according to the first aspect of the invention;

a prediction machine, comprising a neural network of a hierarchical temporal memory type which has been trained as said second neural network with a method according to the first aspect of the invention;

a translation machine, comprising such a classification machine, the neural network of which has been trained using first and second text documents in a first language, and a prediction machine, the neural network of which has been trained using first and second text documents in a second language, wherein nodes of the neural network of the classification machine are connected to nodes of the neural network of the prediction machine.

In all aspects the invention combines three different technologies in an entirely novel way, i.e. self-organizing maps (SOMs), the reverse-indexing of keywords in a SOM, and a target neural network exposed to text translated into a stream of patterns.

One of the principles of the invention is the generation of a novel type of a "keyword vs. pattern" dictionary (hereinafter: the "pattern dictionary") containing an association between a keyword and a two (or more) dimensional pattern. This pattern represents the semantics of the keyword within the context of the first document set. By choosing an appropriate collection of semantic contexts as first document set, e.g. articles of an encyclopaedia as will be described later on, each pattern reflects the semantic context and thus meaning of a keyword.

The patterns are generated by a SOM neural network, in particular a "Kohonen self organizing map" ("Kohonen feature map"). For details of SOMs see e.g. Kohonen, T., "The Self-Organizing Map", Proceedings of the IEEE, 78(9), 1464-1480, 1990; Kohonen, T., Somervuo, P., "Self-Organizing Maps of Symbol Strings", Neurocomputing, 21(1-3), 19-30, 1998; Kaski, S., Honkela, T., Lagus, K., Kohonen, T., "Websom-Self-Organizing Maps of Document Collections", Neurocomputing, 21(1-3), 101-117, 1998; Merkl, D., "Text Classification with Self-Organizing Maps: Some Lessons Learned", Neurocomputing, 21(1-3), 61-77, 1998; Vesanto, J., Alhoniemi, E., "Clustering of the Self-Organizing Map", IEEE Transactions on Neural Networks, 11(3), 586-600, 2000; Pölzlbauer G., Dittenbach M., Rauber A., "Advanced Visualization of Self-Organizing Maps with Vector Fields", IEEE Transactions on Neural Networks 19, 911-922, 2006; the disclosures of which papers are herein incorporated by reference in their entirety.

The SOM-generated patterns are subsequently used to translate keyword sequences from a second (training) set of text documents into pattern sequences to be fed into the second (target) neural network for pattern recognition. Pattern recognition is one of the core competences of neural networks. Since each pattern represents an intrinsic meaning of a keyword, and a sequence of patterns represents a contextual meaning of keywords, the semantics of the keywords in the second document set is analyzed by the target neural network under reference to, and before the background of, the intrinsic meaning of the keywords in the context of the first document set. As a result, the target neural network can efficiently and meaningfully analyze the semantics of a text.

The methods and apparatus of the invention are suited for training all sorts of target neural networks. A preferred application is the training of neural networks which are hierarchical and, at least partly, recurrent, in particular neural networks of the memory prediction framework (MPF) or hierarchical temporal memory (HTM) type. For theory and implementation details of MPFs and HTMs see e.g. Hawkins, J., George, D., Niemasik, J., "Sequence Memory for Prediction, Inference and Behaviour", Philosophical Transactions of the Royal Society of London, Series B, Biological Sciences, 364 (1521), 1203-9, 2009; Starzyk, J. A., He, H., "Spatio-Temporal Memories for Machine Learning: A Long-Term Memory Organization", IEEE Transactions on Neural Networks, 20(5), 768-80, 2009; Numenta, Inc., "Hierarchical Temporal Memory Including HTM Cortical Learning Algorithms", Whitepaper of Numenta, Inc., Version 0.2.1, Sep. 12, 2011; Rodriguez A., Whitson J., Granger R., "Derivation and Analysis of Basic Computational Operations of Thalamocortical Circuits", Journal of Cognitive Neuroscience, 16:5, 856-877, 2004; Rodriguez, R. J., Cannady, J. A., "Towards a Hierarchical Temporal Memory Based Self-Managed Dynamic Trust Replication Mechanism in Cognitive Mobile Ad-hoc Networks", Proceedings of the 10th WSEAS international conference on artificial intelligence, knowledge engineering and data bases, 2011; as well as patents (applications) Nos. US 2007/0276774 A1, US 2008/0059389 A1, U.S. Pat. No. 7,739,208 B2, U.S. Pat. No. 7,937,342 B2, US 2011/0225108 A1, U.S. Pat. No. 8,037,010 B2 and U.S. Pat. No. 8,103,603 B2; the disclosures of which papers and patents are herein incorporated by reference in their entirety.

MPF and HTM neural networks store hierarchical and time-sequenced representations of input pattern streams and are particularly suited to grasp time-spanning and hierarchical semantics of text. Their nodes (neurons) on different hierarchical layers represent per se hierarchical abstractions (classes) of keywords; classification (abstraction) is an intrinsic working principle of such networks when input is fed from bottom to top of the hierarchy, and prediction (detailing) is an intrinsic working principle when input is fed from top to bottom of the hierarchy.

In a further aspect of the invention the concept of nodes representing entire classes (abstractions, categories) of keywords is utilized to build a translation machine as a prediction machine mapped to node outputs of a classification machine.

According to a further aspect of the invention several second documents can be used and translated into training pattern streams to train the second neural network on a specific set of second documents.

In some embodiments of the invention the second documents are sorted by ascending complexity and, when training the second neural network, the separate sequences of patterns are fed into the second neural network in the sorting order of the second documents from which they have each been formed and translated. This leads to a faster training of the second neural network.

In some other aspects of the invention the complexity of a second document is ascertained on the basis of one or more of: the number of different keywords in that second document, the average length of a sentence in that second document, and the frequency of one or more keywords of the first set in that second document.

BRIEF DESCRIPTION OF THE DRAWINGS

The invention is further described in detail under reference to the accompanying drawings, in which.

DETAILED DESCRIPTION OF THE INVENTION

Figure 1:
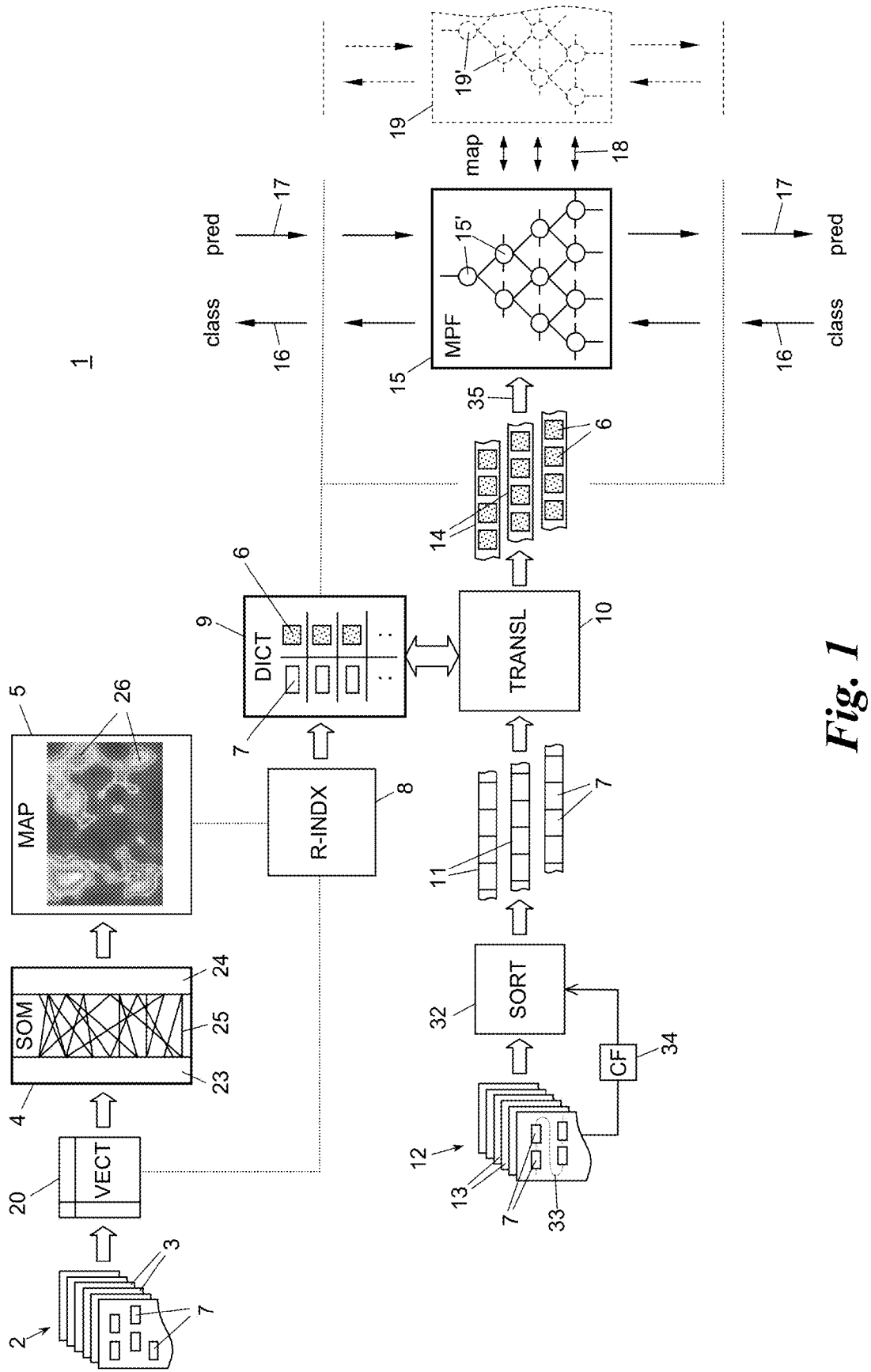
FIG. 1 is an overview flowchart of the method of the invention, including block diagrams of first and second neural networks, a pattern dictionary, as well as classification, prediction and translation machines according to the invention.

In a general overview, FIG. 1 shows a semantic text processing method and system 1 which uses a first set 2 of first text documents 3 to train a first neural network 4. The first neural network 4 is of the self organizing map (SOM) type and creates a self organizing map (SOM) 5. From SOM 5 patterns 6 representative of keywords 7 occurring in the first document set 2 are created by reverse-indexing stage 8 and put into a pattern dictionary 9.

The pattern dictionary 9 is used in a translation stage 10 to translate keyword sequences 11 extracted from a second set 12 of second documents 13 into pattern sequences 14. With the pattern sequences 14 a second neural network 15 is trained. The second neural network 15 is preferably (although not necessarily) of the memory prediction framework (MPF) or hierarchical temporal memory (HTM) type. The trained second neural network 15 can then be used either to semantically classify text translated with pattern dictionary 9, see path 16, or to semantically predict text translated with pattern dictionary 9, see path 17. A further optional application of the trained second neural network 15 is a hierarchical mapping, see paths 18, to an optional third neural network 19 which is similar in construction to the second neural network 15 but has been trained in a different language than the second neural network 15; node mappings 18 then represent semantic coincidences between semantic nodes 15' of first language network 15 and semantic nodes 19' of second language network 19.

The processes and functions of the components shown in FIG. 1 are now described in detail with reference to FIGS. 2 to 10.

Figure 2:
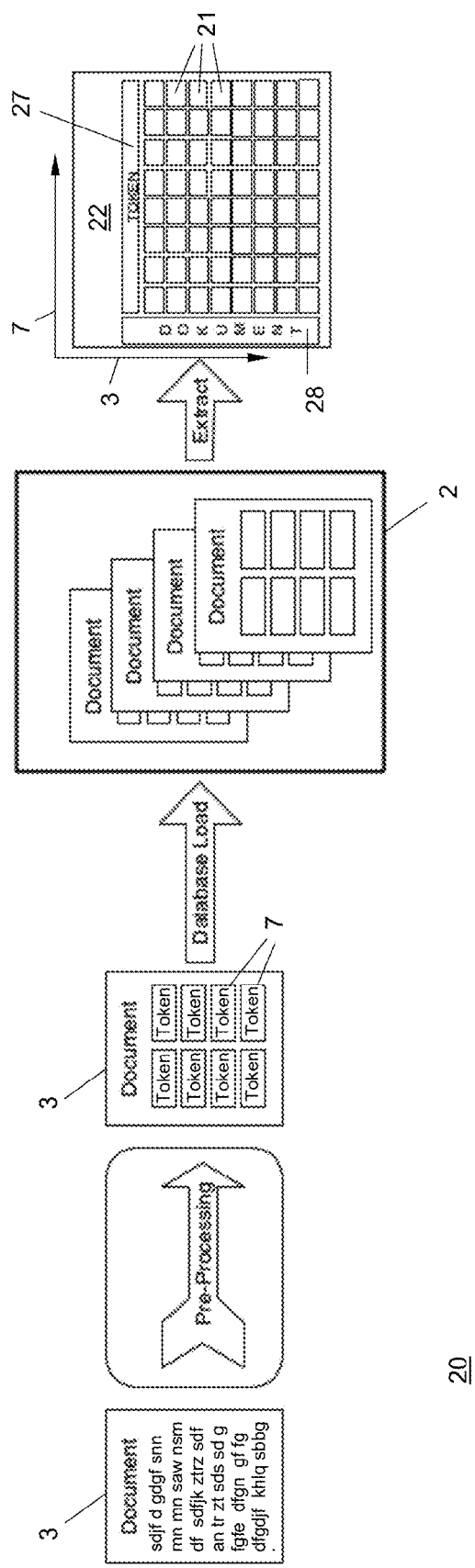
FIG. 2 is a flowchart of the vector processing stage for the first document set as input vector to the first neural network in FIG. 1.

FIG. 2 shows a preprocessing and vectorization step 20 to index and vectorize the first set 2 of first documents 3. In step 20 from first set 2 a sequence of input vectors 21 is produced, one vector 21 for each first document 3, as an input training vector set or matrix (table) 22 applied to the input layer 23 of the first neural network (SOM) 4. As known to the man skilled in the art, SOM neural network 4 usually comprises only two layers, an input layer 23 and an output layer 24 of neurons (nodes), interconnected by connections 25 the weights of which can be represented by a weighting matrix. SOM neural networks can be trained with unsupervised learning algorithms wherein the weights of the weighting matrix are self-adapting to the input vectors, to specifically map nodes of the input layer 23 to nodes of the output layer 24 while taking into account the spatial relation of the nodes of the output layer 24 in a two (or more) dimensional map 5. This leads to maps 5 which cluster input vectors 21 with regard to their similarity, yielding regions 26 in the map 5 with highly similar input vectors 21. For details of SOM neural networks, see the above-cited bibliographic references.

The first set 2 and the first documents 3 therein are chosen in such a number and granularity, e.g. length of the individual documents 3, that each of the documents 3 contains a number of e.g. 1 to 10, 1 to 20, 1 to 100, 1 to 1000 or more, preferably about 250 to 500, keywords 7 in a semantic context. A first document 3 may contain—in addition to the keywords 7—words of little semantic relevance (such as articles "a", "the" et cet.) which are usually called stop words, here non-keywords.

The number of documents 3 in the set 2 is chosen to obtain a representative corpus of semantic contexts for the keywords 7, e.g. thousands or millions of documents 3. In an exemplary embodiment, about 1,000,000 documents 3, each comprising about 250 to 500 keywords 7, are used as first document set 2.

The length (keyword count) of the documents 3 should be fairly consistent over the entire set 2, keywords 7 should be evenly and sparsely distributed over the documents 3 in the set 2, and each document 3 should contain a good diversity of keywords 7.

Keywords 7 can also be roots (lemma) of words, so that e.g. for singular and plural forms (cat/cats) or different verb forms (go/going) only one keyword 7 is taken into account. Keywords 7 can thus be both, specific word forms and/or roots of words. After stripping-off words incapable of building significant keywords, such as stop words, each document 3 can be considered a "bag of words" of keywords 7.

In a practical embodiment, a suitable first set 2 can e.g. be generated from articles from an encyclopaedia, such as Wikipedia® articles obtained under the "Creative Commons Attribution Licence" or the "GNU Free Documentation Licence" of the Wikipedia® project. Such encyclopaedic articles, or entries, respectively, can be parsed according to chapters, paragraphs et cet. into documents 3 of fairly uniform length, so that each document 3 contains keywords 7 in a semantic, i.e. meaningful context.

To generate the vectors 21, an index of all keywords 7 occurring in the entire set 2 is generated and spread horizontally as column heading 27 of the matrix (table) 22. Vice versa, document identifications ("id") of all documents 3 in the entire set 2 are spread vertically as row heading 28 in matrix 22. Then, for each occurrence of a specific keyword 7 in a specific document 3, a flag or binary "1" is put into the respective cell of the matrix 22. Thus, in matrix 22 one horizontal row represents a normalized "keyword-occurrence" vector 21 for one document 3, wherein a binary "1" at a specific keyword position (column position) indicates that this keyword 7 is contained in the "bag of words" of this document 3; and a binary "0" indicates the absence of this keyword 7 in this document 3. Or, the other way around, each column in matrix 22 shows for a specific keyword 7 all those documents 3 marked with a binary "1" which contain that keyword 7.

The input vectors 21, i.e. rows of the matrix 22 representing the documents 3 and their keyword contents, are then supplied successively to the input layer 23 of SOM neural network 4 to train it. This means that if a first set 2 of e.g. 1,000,000 first documents 3 is used, a training run of 1,000,000 vector inputs is supplied to the first neural network 4.

Figure 3:
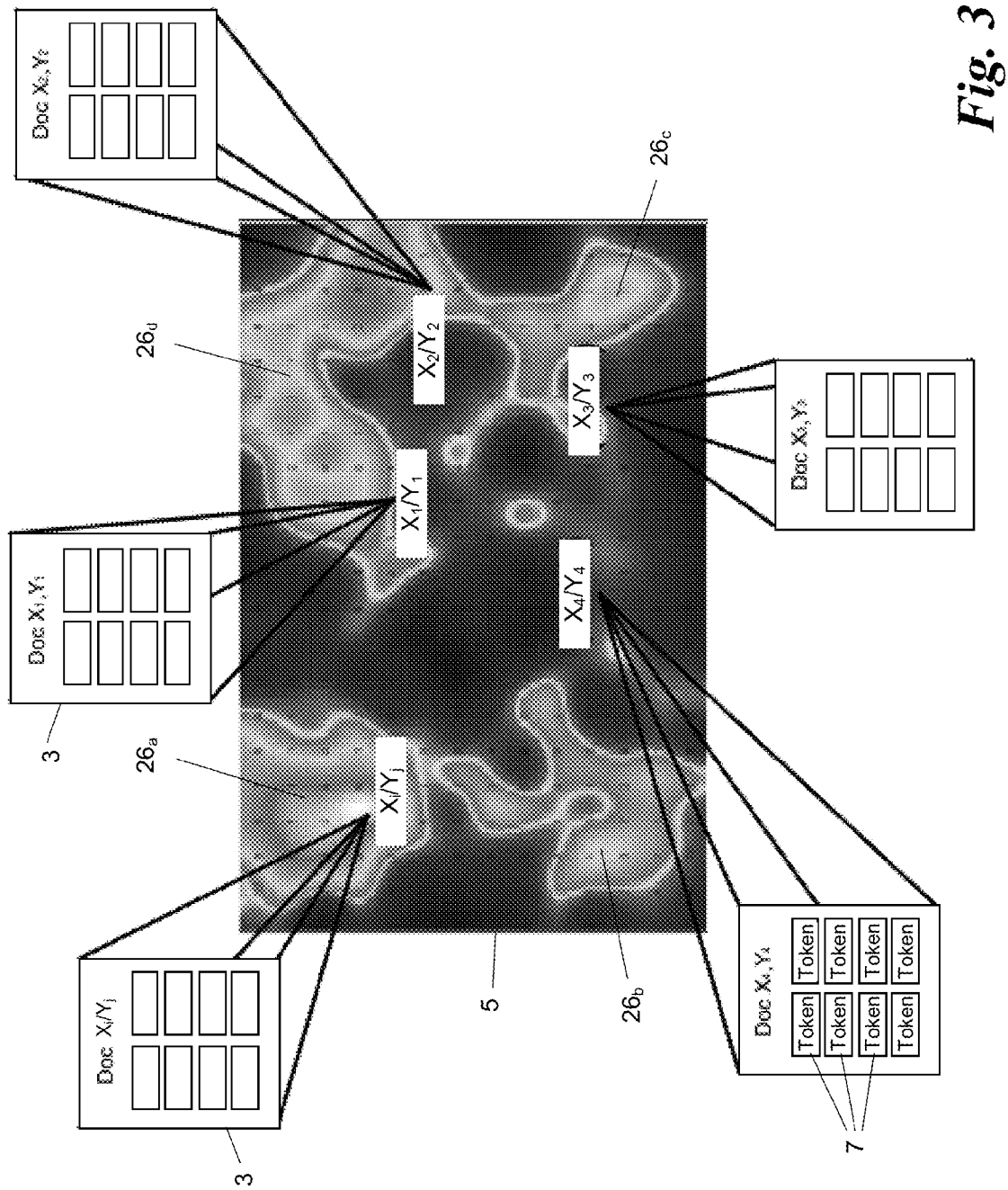
FIG. 3 is an exemplary self organizing map (SOM) created as output of the first neural network in FIG. 1.

As a result of this training run, the output layer 24 of SOM neural network 4 has produced map 5 in which documents 3 (vectors 21) have been mapped to individual points ("pixels") $X_i/Y_j$ of the map 5, clustered by similarity. FIG. 3 shows an example of a map 5. To each map point $X_1/Y_1, X_2/Y_2, \ldots, X_i/Y_j, \ldots$, zero, one or more document(s) 3 with their bag of keywords 7 has/have been mapped. Documents 3 (vectors 21) are identified in map 5 e.g. by their document id from row heading 28. By that SOM clustering process, different documents 3 which contain very similar keywords 7, e.g. which coincide in 80% or 90% of their keywords, are mapped in close spatial relationship to one another, thus forming semantic "regions" $26_a$, $26_b$, $26_c$, $26_d$, et cet. in map 5.

Figure 4:
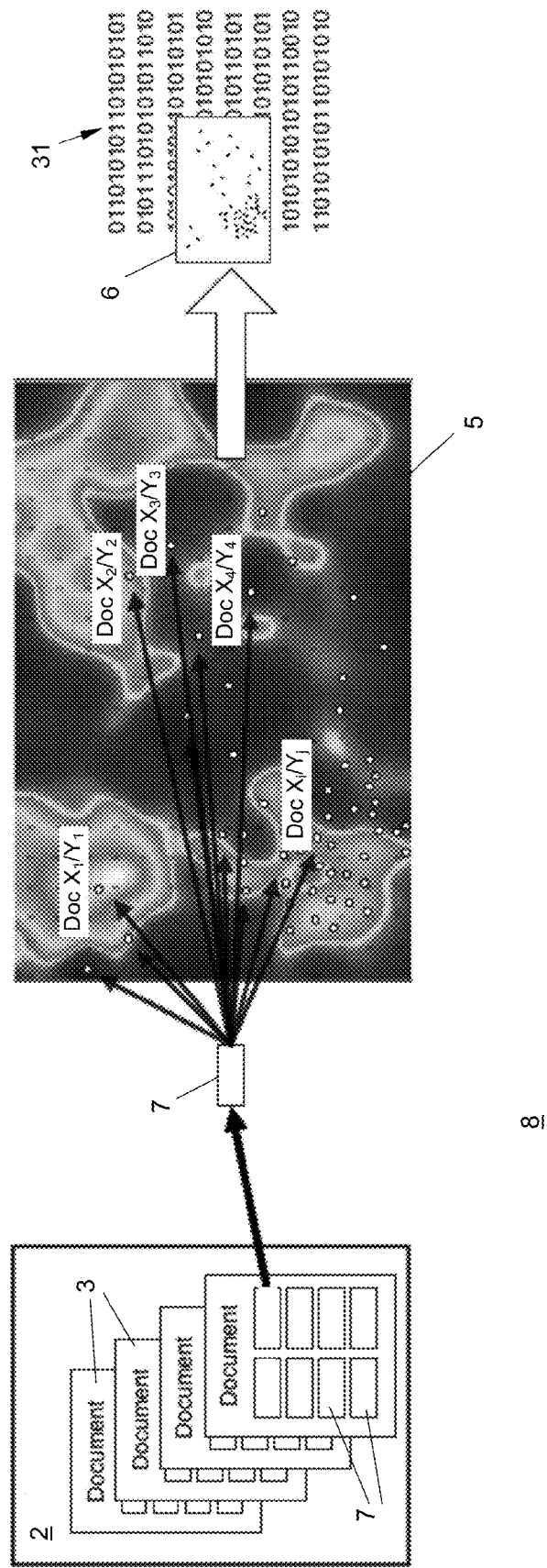
FIG. 4 is a flowchart of the reverse-indexing stage, receiving inputs from the vector processing stage and the SOM, to create the pattern dictionary in FIG. 1.

Next, in the reverse-indexing stage 8 of FIG. 4, on the basis of matrix 22 for a given keyword 7 from keyword index 27 all those documents 3 are identified which contain that keyword 7. This can e.g. be easily done by retrieving all binary "1" in the specific column of the given keyword 7 in matrix 22 and looking-up the id of the document 3 listed in row heading 28.

For those documents 3 which have been ascertained as containing that given keyword 7, all map points $X_i/Y_j$ referencing that specific document id are determined from map 5. This set $\{X_i/Y_j\}$ of map points represents the pattern 6. The pattern 6 is representative of the semantic contexts in which that given keyword 7 occurred in the first set 2. The spatial (i.e. two- or more-dimensional) distribution of the points $X_i/Y_j$ in the pattern 6 reflects those specific semantic regions $26_a$, $26_b$, . . . in the context of which the keyword 7 occurred in the first set 2.

Pattern 6 can be coded as a binary map 31, see FIG. 4, and also regarded as a binary "fingerprint" or "footprint" of the semantic meaning of a keyword 7 in a document collection such as the first set 2. If the first set 2 covers a vast variety of meaningful texts in a specific language, the pattern 6 is of high semantic significance of the keyword 7.

The spatial resolution of the pattern 6 can be equal to or lower than the spatial resolution of the SOM neural network 4 and/or the map 5. The spatial resolution of the latter can be chosen according to the required analysis performance: For example, map 5 can be composed of millions of map points $X_i/Y_j$, e.g. 1000×1000 points, and pattern 6 can have the same resolution for high precision, or a coarser resolution for lower memory requirements.

Figure 5:
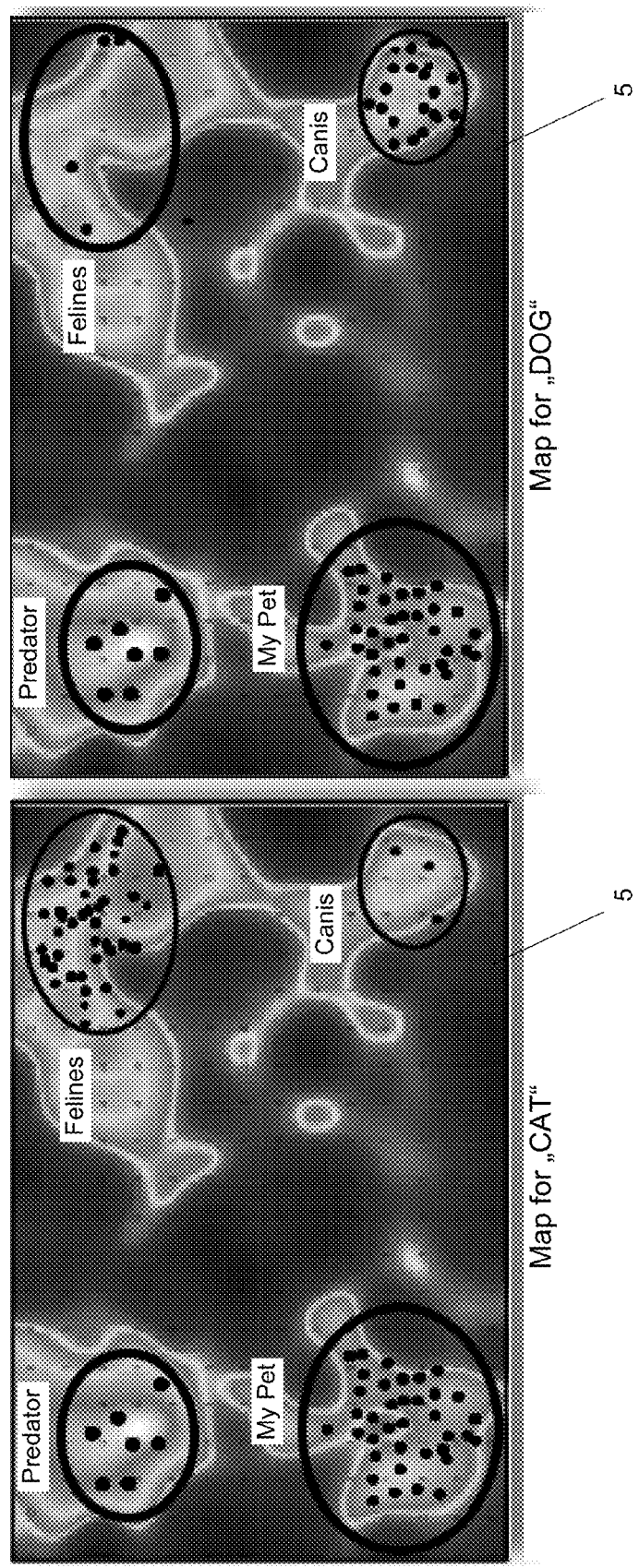
FIG. 5 shows reverse-indexed SOM representations with exemplary patterns for two different keywords within the SOM.

FIG. 5 shows an example of two different patterns 6 (depicted as black dots) overlying map 5 for ease of comprehension. In this example, regions $26_a$, $26_b$, $26_c$, $26_d$ have been manually labeled with semantic classes such as "predator", "felines", "my pet" and "canis". This is only for exemplary purposes; it should be noted that such a labeling is not necessary for the correct functioning of the present methods, processes and algorithms which only require the spatial SOM distribution of the map points $X_i/Y_j$.

In the left representation of FIG. 5, all documents 3 in which the keyword "cat" occurred have been marked with a dot. In the right representation of FIG. 5, all documents 3 containing the keyword "dog" have been marked with a dot.

It can easily be seen that "cat" documents primarily fall, or are clustered, into regions $26_b$ ("my pet") and $26_d$ ("felines"), whereas "dog" documents 3 are primarily clustered into regions $26_b$ ("my pet") and $26_c$ ("canis").

Returning to FIG. 1, for each keyword 7 occurring in the first set 2 the respective pattern 6 is stored in pattern dictionary 9 in the form of a two-way mapping, i.e. association between a keyword 7 and its pattern 6. Pattern dictionary 9 constitutes a first, intermediate product of the method and system 1 of FIG. 1. Pattern dictionary 9 can be stored ("embodied") on a computer-readable medium, e.g. a data carrier such as a hard disk, CD-Rom, DVD, memory chip, internet server, a cloud storage in the Internet et cet.

It should be noted that the generation of pattern dictionary 9 may involve the use of massive processing power for training the first neural network 4 and reverse-indexing the map 5. Therefore, pattern dictionary 9 is preferably pre-computed once and can then be used repeatedly in the further stages and modules of the processes and machines of FIG. 1.

Based on different first sets 2 of first documents 3, which can e.g. be chosen application-specific and/or and language-specific, different pattern dictionaries 9 can be pre-computed and distributed on computer-readable media to those entities which perform the subsequent stages and implement the subsequent modules of the processes and machines which will now be described in detail.

In these subsequent stages and modules the second (target) neural network 15 is trained for semantic text processing on the basis of the second set 12 of second documents 13. While the second set 12 could be identical with the first set 2, in practice the second set 12 may comprise a subset of the first set 2 or indeed quite different application-specific second documents 13. For example, while the first set 2 comprises a vast number of general ("encyclopaedic") documents 3, the second set 12 can be an application-specific user data set of user documents 13 which e.g. need to be searched by semantic query (keyword) expansion, classified or sorted by semantic classification, or translated by semantic translation. Pattern dictionary 9 then reflects background semantic knowledge about general semantic meanings of keywords 7, while second neural network 15 performs an in-depth analysis of a user data set 12 of user documents 13.

User documents 13 can e.g. be records from product databases, web-pages, patent documents, medical records or all sorts of data collections which shall be analyzed by the second neural network 15. One prerequisite for the second set 12 is that it has been written in the same language as the first set 2 since otherwise the pattern dictionary 9 could not be applied meaningfully to the second set 12. Furthermore, it is preferably, although not necessary, that keywords 7 occurring in the second documents 13 of the second set 12 are comprised within the entire set, i.e. index 27, of keywords 7 in the first set 2 so that keywords 7 of the second set 12 are listed and can be looked-up in the pattern dictionary 9.

Figure 6:
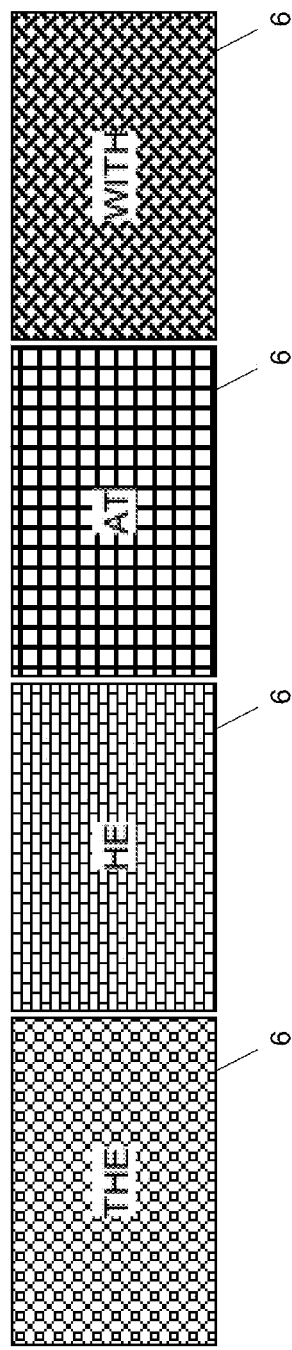
FIG. 6 shows examples of some predetermined patterns for stop words (non-keywords)

In the pattern dictionary 9, stop words or non-keywords can either be disregarded or incorporated as predetermined or preconfigured symbolic patterns such as those shown in FIG. 6.

Figure 7:
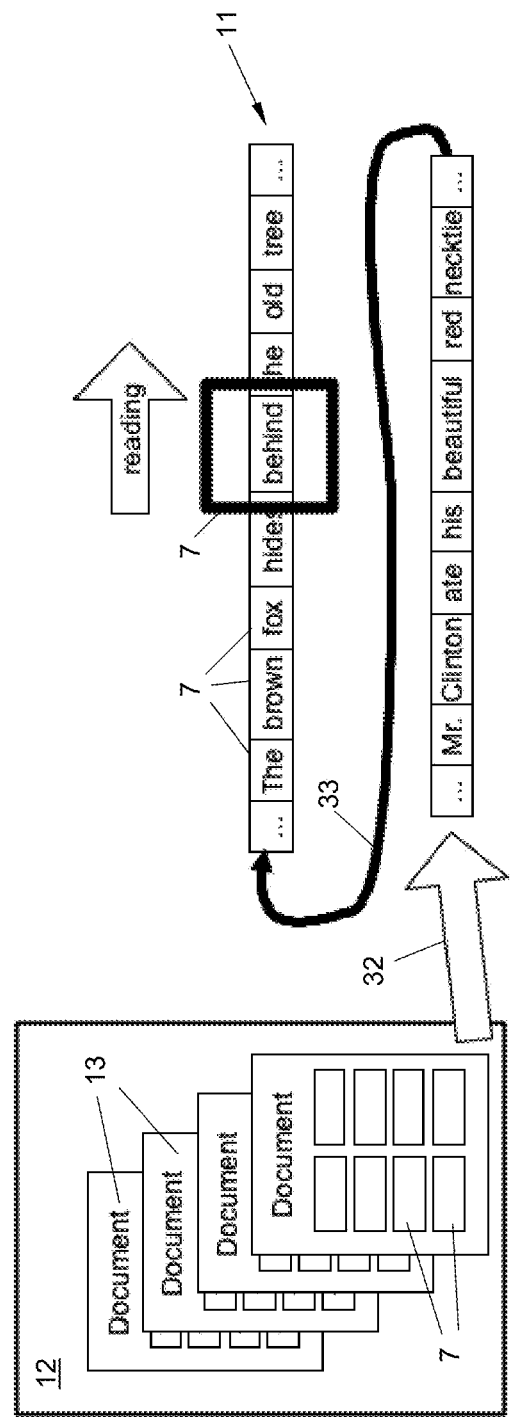
FIG. 7 is a flowchart of the keyword sequence extraction stage for the second set of second documents in FIG. 1.
Figure 8:
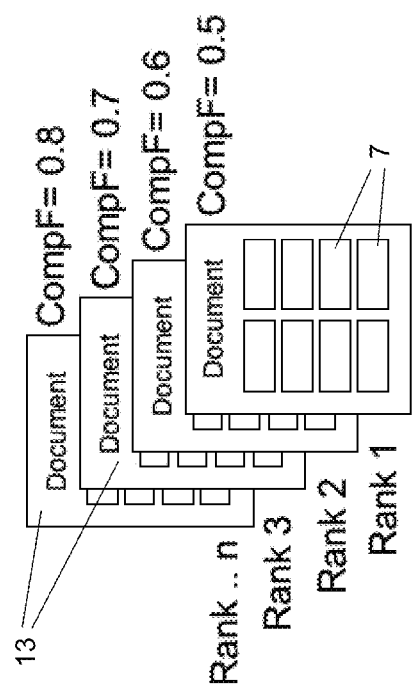
FIG. 8 shows the result of an optional document sorting step for the second documents of the second set.

For training the second neural network 15, in a first stage 32 sequences 11 of keywords 7 are extracted from the second set 12. FIGS. 1, 7 and 8 show this extraction stage in detail. Basically it would be sufficient if only one or a few second document(s) 13 is/are sequentially read, word by word, line by line, paragraph by paragraph, chapter by chapter, document by document, in a normal reading sequence 33. Stop words or non-keywords could be skipped (or dealt with separately as described in FIG. 6), and the result is one sequence 11 of keywords 7. Preferably, however, the second set 12 is split into a multitude of second documents 13, and one sequence 11 of keywords 7 is generated for one document 13. The sequences 11 are then used—e.g. in the order of the documents 13, they originate from—as training input for the second neural network 15.

Training of the second neural network 15 can be accelerated if an optional sorting of the documents 13 and/or sequences 11 is performed in extraction stage 32. For this optional sorting, a "complexity factor" CompF is calculated in a process 34 for each document 13 of the second set 12. The complexity factor CompF can be calculated on the basis of one or more of the following parameters of a document 13:

the number of different keywords 7 in a document 13;

the average word count of a sentence or paragraph in a document 13;

the frequency, or diversity, of one or more of the keywords 7, e.g. of all keywords 7 of the first set 2, in a document 13;

the frequency of one or more of the keywords 7, e.g. all keywords 7, of a document 13 in the entire first set 2 or another text corpus representative of colloquial language, e.g. a collection of newspapers.

In extraction stage 32 the documents 13 can then be sorted (ranked) according to ascending complexity factor CompF, see FIG. 8. In this way the second neural network 15 is fed with sequences 11 of increasing complexity, e.g. primitive or simple sequences 11 or sequences 11 with a modest diversity of keywords 7 are used first, and sequences 11 with complicated semantic and linguistic structures are used last for training the second neural network 15.

Before being fed to the second neural network 15, the sequences 11 of keywords 7 are translated in translation stage 10 on the basis of the pattern dictionary 9. Each keyword 7 in a sequence 11 is looked-up in pattern dictionary 9, the associated pattern 6 is retrieved, and the results are sequences 14 of patterns 6, one pattern sequence 14 for each document 13. Each pattern sequence 14 can be considered as a time-series or "movie clip" of patterns 6 representing the semantic context of keywords 7 in a document 13 within the global semantic context of the first document set 2.

Figure 9:
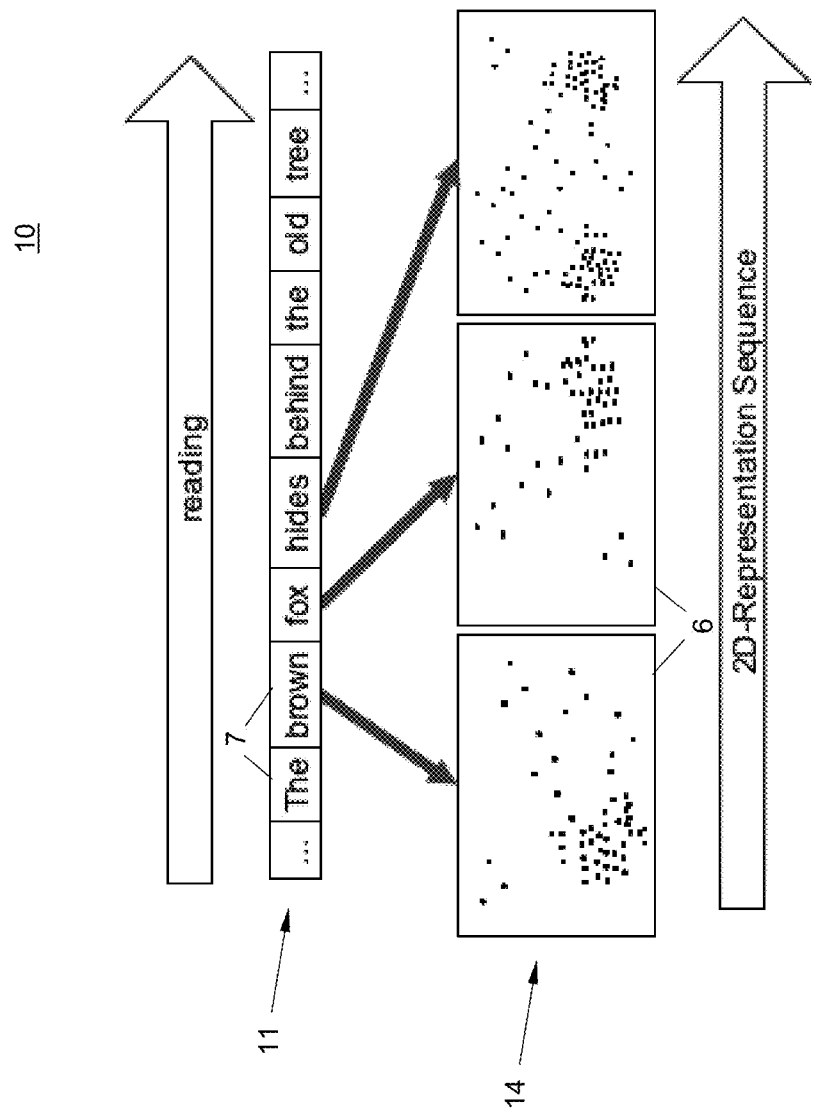
FIG. 9 is a flowchart of the steps of translating a keyword sequence into a pattern sequence in FIG. 1.

It should be noted that in simple embodiments it would be sufficient to use only one long sequence 14 of patterns 6 to train the second neural network 15. Preferably a large number of pattern sequences 14 (a "sequence of sequences") is used, each pattern sequence 14 representing a time-lined training vector (matrix) for the second neural network 15. FIG. 9 shows an example of the translation stage 10 translating a keyword sequence 11 into a pattern sequence 14.

In the training stage (arrow 35 in FIG. 1) the second neural network 15 is fed successively with pattern sequences 14 to learn the patterns 6 and their sequences over time. As discussed at the outset, all types of neural networks adapted for time-series processing of patterns can be used, e.g. feedforward pattern processing neural networks with sliding windows. Alternatively and preferably, recurrent or at least partly recurrent neural networks, with or without delay loops, can be used to learn and remember temporal sequences, e.g. self- or auto-associative neural networks.

Figure 10:
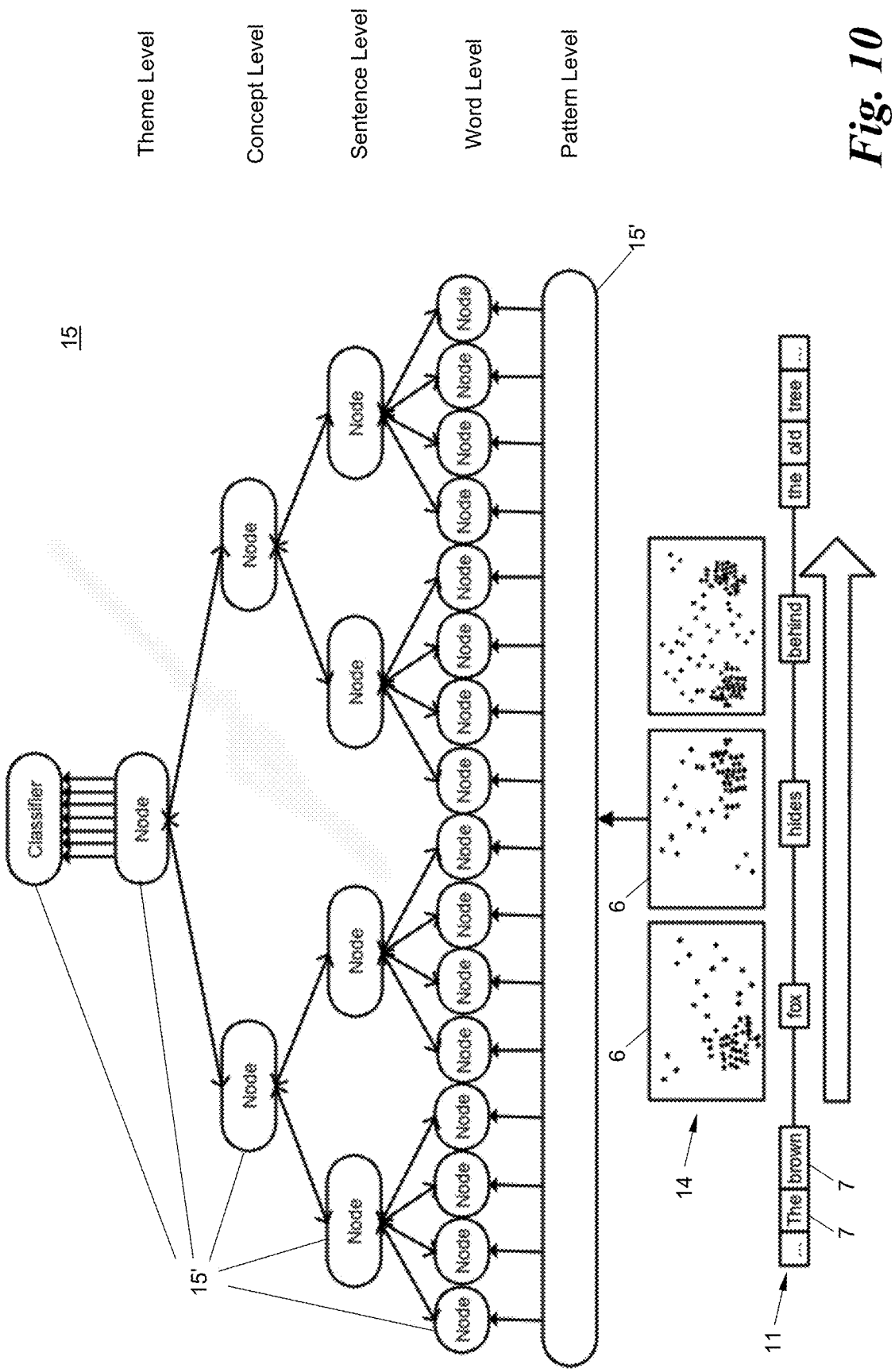
FIG. 10 shows an exemplary hierarchical node structure of a MPF used as the second neural network in FIG. 1.

In advantageous embodiments the second neural network 15 is also hierarchical in that upper layers of the hierarchy comprise fewer nodes (neurons) than lower layers of the hierarchy. FIG. 10 shows an example of such a hierarchical network, in particular a memory prediction framework (MPF) which also contains lateral (intra-layer, see FIG. 1) and vertical (cross-layer) feedback connections for learning temporal sequences. A preferred form of such a MPF architecture are neural networks of the hierarchical temporal memory (HTM) type. Theory and implementation details of MPF and HTM neural networks are described in the above cited papers, the disclosures of which are herein incorporated by reference.

MPF and HTM networks develop—in trained configuration—neurons (nodes) within the hierarchy which stand for abstractions (classifications) of firing patterns of neurons (nodes) in lower layers of the hierarchy. By using trained recurrent (feedback) intra-layer and cross-layer connections, in particular between nodes of "columnar" sub-layer structures, they can model the temporal behaviour of entire temporal streams of firing patterns. In this way, MPF and HTM networks can learn, remember and classify streams of patterns and both recognize pattern sequences as well as predict possible future pattern sequences from past pattern sequences.

Once the neural network 15 has been trained with the pattern sequences 14, new patterns 6 or new pattern sequences 14 can be applied as new inputs to a "classification" input at lower hierarchy levels of the network 15, to obtain semantic classifications/abstractions as patterns from the outputs of nodes at higher hierarchy levels, see route 16; or, new patterns 6 or new pattern sequences 14 can be fed into "prediction" inputs at higher hierarchy levels and predicted patterns (semantical predictions) can be obtained from lower levels in the hierarchy, see route 17.

As can be seen in FIG. 1, pattern dictionary 9 is used on both routes 16, 17 to translate any new "query" sequence of keywords 7 into a "query" sequence 14, and to retranslate the output patterns of the neural network 15 into "resulting" classification or prediction keywords 7.

Classification route 16 can thus be used to classify a query text by the trained neural network 15 using the pattern dictionary 9 on the input and output interfaces of the network 15; and prediction route 17 can be used to predict keywords from a query text, e.g. to "expand" a query keyword phrase to further (predicted) keywords 7 which semantically match the query phrase, using pattern dictionary 9 at both input and output interfaces of the neural network 15.

A further application of the trained neural network 15 is shown in dotted lines in FIG. 1. A third neural network 19 trained with sets 2, 12 of documents 3, 13 in a different language than that in which the neural network 15 had been trained is nodewise mapped—if corresponding classification nodes 15', 19' within the networks 15 and 19 can be identified—to the second network 15. On the inputs and outputs 38, 39 of the third neural network 19 a further pattern dictionary 9, generated from a document set 2 in the language of the third network 19, is used. In this way, semantic translations between two languages can be obtained by semantic mapping of two trained MPF or HTM networks 15, 19.

While the invention has been described with reference to two-dimensional maps 5 and patterns 6, it should be noted that the first neural network 4 could also generate three- or more-dimensional maps 5, thus leading to three- or more-dimensional patterns 6 in pattern dictionary 9, subsequently to three- or more-dimensional pattern sequences 14 and second and third neural networks 15, 19 working in three or more dimensions.

The invention is in no way limited to the specific embodiments described as examples in detail but comprises all variants, modifications and combinations thereof which are encompassed by the scope of the appended claims. In particular, the methods of the independent main claims can be combined with the features recited in one or more of all their dependent claims.

What is claimed is:

1. A computer-implemented method of training a neural network, comprising:

training a first neural network of a self organizing map type with a first set of first text documents each containing one or more keywords in a semantic context to map each document to a point in the self organizing map by semantic clustering;

performing a reverse indexing by determining, for each keyword occurring in the first set, all points in the self organizing map to which first documents containing said keyword are mapped, and storing said mapped points as a pattern for said keyword in a pattern dictionary;

forming at least one sequence of keywords from a second set of second text documents each containing one or more keywords in a semantic context;

translating said at least one sequence of keywords into at least one sequence of patterns by using said pattern dictionary; and training a second target neural network with said at least one sequence of patterns.

2. The method of claim 1, wherein the second neural network is hierarchical and at least partly recurrent.

3. The method of claim 1, wherein the second neural network is a memory prediction framework.

4. The method of claim 1, wherein the second neural network is a hierarchical temporal memory.

5. The method of claim 1, wherein the first neural network is a Kohonen self organizing map.

6. The method of claim 1, wherein for each of the second documents of the second set a separate sequence of keywords is formed and translated into a separate sequence of patterns and the second neural network is trained successively with each of said separate sequences of patterns.

7. The method of claim 6, wherein the second documents are sorted by ascending complexity and, when training the second neural network, the separate sequences of patterns are fed into the second neural network in the sorting order of the second documents from which they have each been formed and translated.

8. The method of claim 7, wherein the complexity of a second document is ascertained on the basis of one or more of: the number of different keywords in that second document, the average length of a sentence in that second document, the frequency of one or more keywords of the first set in that second document, the frequency of one or more keywords of that second document in the first set or another text corpus.

9. The method of claim 1, comprising:

translating said at least one keyword into at least one pattern by means of the pattern dictionary;

feeding said at least one pattern as an input pattern into said trained second neural network;

obtaining at least one output pattern from said trained second neural network; and translating said at least output pattern into at least one keyword by means of the pattern dictionary.

10. The method of claim 9, wherein the second neural network is hierarchical, said at least one input pattern is fed into at least one lower layer of the hierarchy and said at least one output pattern is obtained from at least one higher layer of the hierarchy.

11. The method of claim 10, wherein the second neural network is at least one of a memory prediction framework or a hierarchical temporal memory.

12. The method of claim 9, wherein the second neural network is hierarchical, said at least one input pattern is fed into at least one higher layer of the hierarchy and said at least one output pattern is obtained from at least one lower layer of the hierarchy.

13. The method of claim 12, wherein the second neural network is at least one of a memory prediction framework or a hierarchical temporal memory.

14. A computer-implemented classification machine, comprising a neural network of a hierarchical temporal memory type which has been trained as said second neural network with a method according to claim 1.

15. A computer-implemented prediction machine, comprising a neural network of a hierarchical temporal memory type which has been trained as said second neural network with a method according to claim 1.

16. A computer-implemented translation machine, comprising a classification machine comprising a neural network of a hierarchical temporal memory type which has been trained as said second neural network with a method according to claim 1 using first and second text documents in a first language; and a prediction machine comprising a neural network of a hierarchial temporal memory type which has been trained as said second neural network with a method according to claim 1 using first and second text documents in a second language;

wherein nodes of the neural network of the classification machine are connected to nodes of the neural network of the prediction machine.

* * * * *